(No Model.)
N. McLEAN.
CULTIVATOR.
No. 342,453. Patented May 25, 1886.
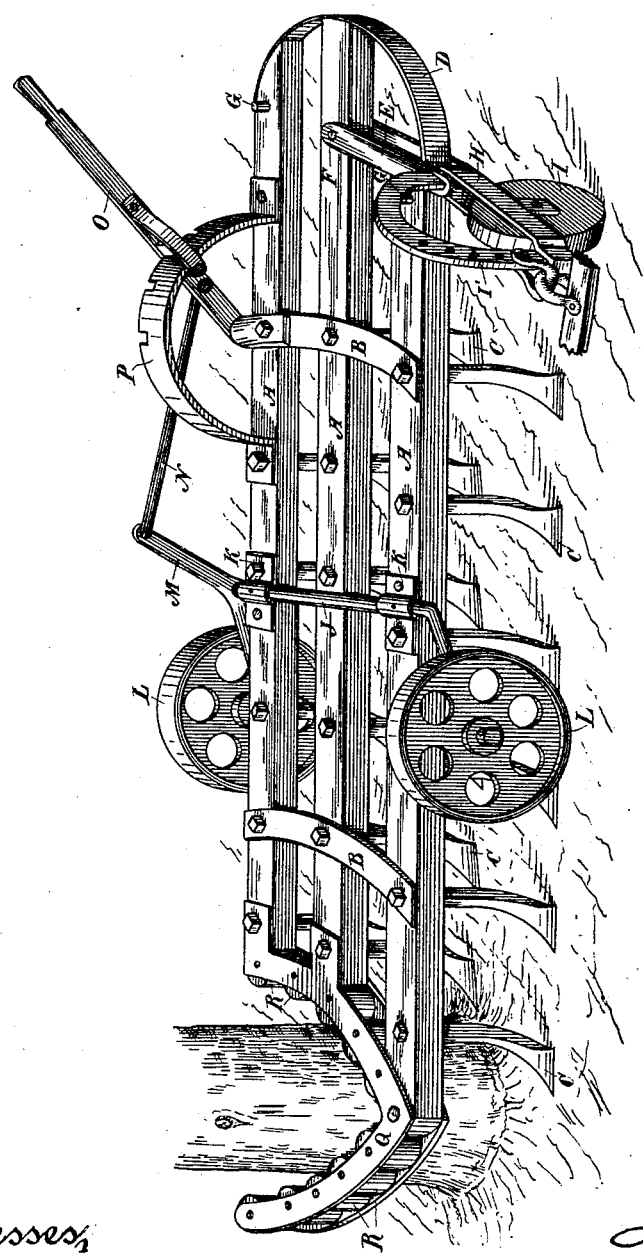
Witnesses,
Geo. H. Strong.
Inventor,
Neil McLean
By
Dewey & Co.
Attys

UNITED STATES PATENT OFFICE.

NEIL McLEAN, OF WATSONVILLE, CALIFORNIA.

CULTIVATOR.

SPECIFICATION forming part of Letters Patent No. 342,453, dated May 25, 1886.

Application filed March 23, 1886. Serial No. 196,308. (No model.)

*To all whom it may concern:*

Be it known that I, NEIL MCLEAN, of Watsonville, Santa Cruz county, State of California, have invented an Improvement in Cultivators; and I hereby declare the following to be a full, clear, and exact description of the same.

My invention relates to a cultivator which is especially adapted for orchard use.

It consists of a frame comprised of two or more parallel timbers, having teeth fixed to it, so as to present their points transversely to one side of the frame, an open-based triangular frame attached to one end, with the apex toward one side and anti-friction rollers set within it, wheels mounted upon a cranked axle extending centrally across the frame, and a means for raising and lowering the frame about these wheels, a hinged swinging wheel attached to the front end of the frame, with means for attaching a team thereto, all of which will be more fully explained by reference to the accompanying drawing, in which the figure is a view of my cultivator, showing its application.

This device is especially intended for cultivating the ground in orchards and around trees in which the branches hang low and extend outward so far that it would be impossible to cultivate close to the trees, by reason of the side draft of a cultivator constructed with an extension to one side for that purpose.

My apparatus consists of a frame-work composed of long bars A A, united by short transverse bars B, as shown. In the present case I have shown the bars A made of considerable length and having cultivator-teeth C fixed in them, so that their points will stand transversely or diagonally to the line of the frame A. The front of the frame-work has a curved strap, D, uniting the front ends, and a link, E, is pivoted to the central bar of the framework, extending above and below the curved strap or guide traveling upon it when turned about the pivot-pin F. G G are stops which limit the motion of this link from side to side about its pin. The front end of this link has hinged to it by a vertical pivot a frame, H, having a single wheel, I, journaled in it, and which partially supports the front end of the harrow-frame. A curved clevis, I', is formed with this frame, and has holes or perforations made in it, so that the team may be attached higher or lower, as may be desired.

J is a cranked axle, turning in boxes K at a point upon the frame A near or just behind the middle. L are wheels upon the ends of the cranked axle, and M is a lever connected with it, by the movement of which the wheels may be depressed and the frame raised clear of the ground, so as to be turned about upon the wheels, or the wheels may be raised and the frame depressed, so as to allow the cultivator-teeth to enter the soil. A link, N, connects this lever-arm with the operating-lever O, and by means of a curved rack, P, the lever O may be held at any desired point, so that the harrow is raised above the ground and drawn upon its supporting-wheels, or lowered so that it rests upon its teeth and the wheels are raised above and out of the way.

At the rear end of the harrow-frame A is a curved angular frame, Q, which is in the form of a triangle, fixed to the rear end of the frame and extending transversely with it, with the point or apex of the triangle standing in the same direction with the teeth of the cultivator. This triangular frame is open at one side, which forms the rear, and it has rubber or other soft elastic rollers R, journaled in its two sides, so as to project inwardly from them.

The operation of this device will then be as follows: The lever P being thrown back, the cranked axle will be thrown down, so that the harrow-frame is raised above the ground and supported by the wheels L and the front wheel, I. It is then drawn along by a team until the open side of the triangular frame Q stands opposite a tree about which it is desired to cultivate the ground. The hand-lever is then thrown forward until the wheels on the cranked axle are raised entirely above the ground and the harrow rests upon its teeth. The horses are then turned toward the right, (the opening in the triangular frame being toward the left,) and as soon as the team has started in this direction the link and jointed frame of the front wheel will be carried around to one side, so that they will stand at right angles with the frame-work A of the harrow. As soon as the team moves in this new direction the rear end of the harrow will be moved to the left, which will cause the triangular frame-work to come in contact with the body of the tree. The elastic rollers within the frame-work fitting against the bark, protect it from any chafing, which would occur if they were not used. The team is then driven about in a circle, of which the tree is the center, and the cultivator-teeth will stir up and pulverize the soil about it into proper condition. These teeth have their points standing in line, which are at right angle with any radial line drawn through them from the central portion of the triangular frame above described, so that when the harrow is carried around the tree the teeth will act properly.

It will be seen from the curved triangular shape of the sides of the frame Q that it will readily fit itself to any size of tree without any especial adjustment, the smaller trees coming nearly to the front or point of the triangular frame and the larger ones remaining farther back.

In every case the elastic rollers turning about the body of the tree prevent any damage to it.

Having thus described my invention, what I claim as new, and desire to secure by Letters Patent, is—

1. A cultivator having an open triangular frame secured to one end, the swinging link and clevis for attaching horses or team to the opposite end, in combination with teeth fixed transversely in the cultivator-frame, with their points standing diagonally to one side of the same, substantially as herein described.

2. The cultivator-frame consisting of longitudinal bars united together and having teeth with their points diagonally toward one side, in combination with a triangular frame having one side secured to the rear end of the tooth-bars, with the apex upon the side toward which the teeth are directed, and the opposite side or base left open, substantially as herein described.

3. A cultivator composed of the parallel bars united together, having teeth secured therein with their points projecting transversely and diagonally toward one side, a triangular frame secured to the rear end of the parallel bars, with its apex in the direction toward which the teeth point and the rear side or base left open, in combination with elastic rollers journaled within the triangular frame.

4. A cultivator composed of parallel bars united together, having teeth set transversely and diagonally with their points toward one side, and an open-based triangular frame, a bearing wheel or wheels journaled in a frame which is pivoted to swing about the opposite end of the tooth-carrying bars, in combination with a cranked axle journaled transversely upon the frame, having wheels upon the end, and a lever and rack by which the cultivator can be raised and lowered, substantially as herein described.

5. A cultivator composed of parallel bars united together, having teeth fixed transversely in them, with their points toward one side, the open-based triangular frame secured in one end of these bars with its apex in the direction of the teeth-points, the cranked axle and wheels journaled transversely across the tooth-bars, which may be raised or lowered about said axle, as shown, in combination with a bearing-wheel journaled in a frame which is swiveled to the front end of the tooth-bars, a curved guide upon which the link travels, and stops by which its movement is limited, substantially as herein described.

In witness whereof I have hereunto set my hand.

NEIL McLEAN.

Witnesses:
S. H. NOURSE,
H. C. LEE.